United States Patent
Park

(10) Patent No.: US 9,392,186 B2
(45) Date of Patent: Jul. 12, 2016

(54) MOBILE TERMINAL AND CONTROL METHOD THEREOF CAPTURING FIRST AND SECOND IMAGES WITH FIRST AND SECOND FLASHES

(71) Applicant: LG ELECTRONICS INC., Seoul (KR)

(72) Inventor: Suyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/497,109

(22) Filed: Sep. 25, 2014

(65) Prior Publication Data

US 2015/0092073 A1 Apr. 2, 2015

(30) Foreign Application Priority Data

Oct. 1, 2013 (KR) .................. 10-2013-0117517

(51) Int. Cl.
*H04N 5/232* (2006.01)
*H04N 5/235* (2006.01)
*H04N 5/262* (2006.01)

(52) U.S. Cl.
CPC ............ *H04N 5/2355* (2013.01); *H04N 5/232* (2013.01); *H04N 5/2354* (2013.01); *H04N 5/2356* (2013.01); *H04N 5/2625* (2013.01)

(58) Field of Classification Search
CPC ... H04N 5/2355; H04N 5/232; H04N 5/2625; H04N 5/2356; H04N 5/2354
USPC .......................... 348/224.1, 221.1, 371, 362
See application file for complete search history.

(56) References Cited

U.S. PATENT DOCUMENTS

| 5,420,635 A | 5/1995 | Konishi et al. | |
| 6,256,067 B1 | 7/2001 | Yamada | |
| 2002/0076096 A1* | 6/2002 | Silber | G01J 1/32 382/152 |
| 2005/0195317 A1 | 9/2005 | Myoga | |
| 2007/0153086 A1 | 7/2007 | Usui et al. | |
| 2011/0063481 A1* | 3/2011 | Natori | H04N 9/045 348/273 |
| 2011/0297828 A1* | 12/2011 | Weisbach | H04N 5/35581 250/330 |
| 2012/0274838 A1* | 11/2012 | Teggatz | H04N 5/2256 348/371 |
| 2012/0320238 A1* | 12/2012 | Chen | H04N 5/2354 348/239 |
| 2015/0062410 A1* | 3/2015 | Kim | H04N 5/2353 348/362 |
| 2015/0292884 A1* | 10/2015 | Fuchikami | G01P 13/00 348/135 |
| 2015/0312553 A1* | 10/2015 | Ng | H04N 13/0242 348/47 |

FOREIGN PATENT DOCUMENTS

| DE | 10200705374 A1 | 5/2009 |
| FR | 2902263 A1 | 12/2007 |

* cited by examiner

*Primary Examiner* — Hung Lam
(74) *Attorney, Agent, or Firm* — Birch, Stewart, Kolasch & Birch, LLP

(57) ABSTRACT

A mobile terminal including a wireless communication unit configured to provide wireless communication; a camera; a flash; and a controller configured to capture, via the camera, a first image while controlling the flash to emit a first flash, capture, via the camera, a second image while controlling the flash to emit a second flash, and generate a third image by combining a first area of the first image and a second area of the second image.

18 Claims, 18 Drawing Sheets

FIG. 5
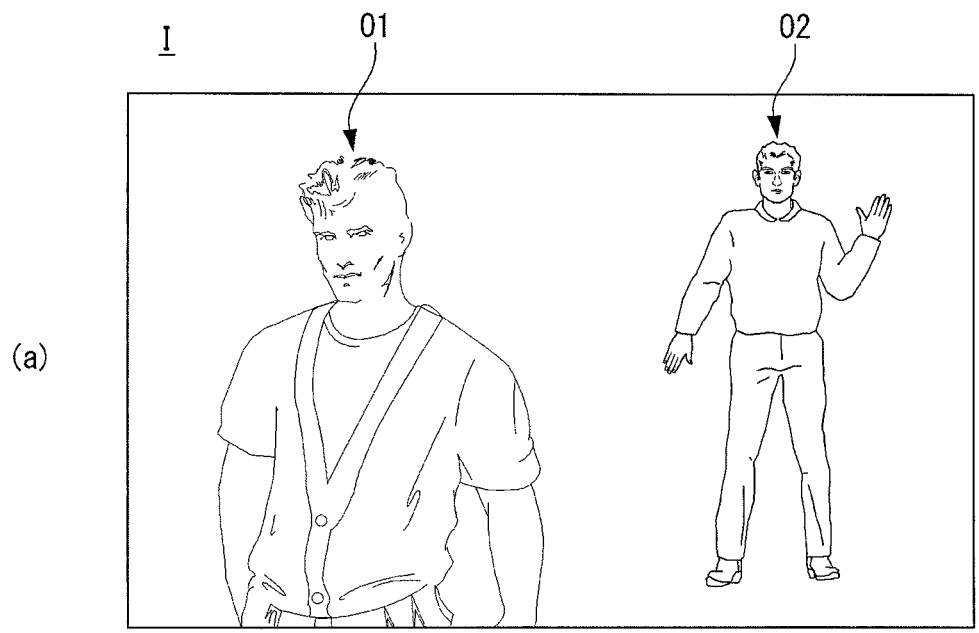
(a)
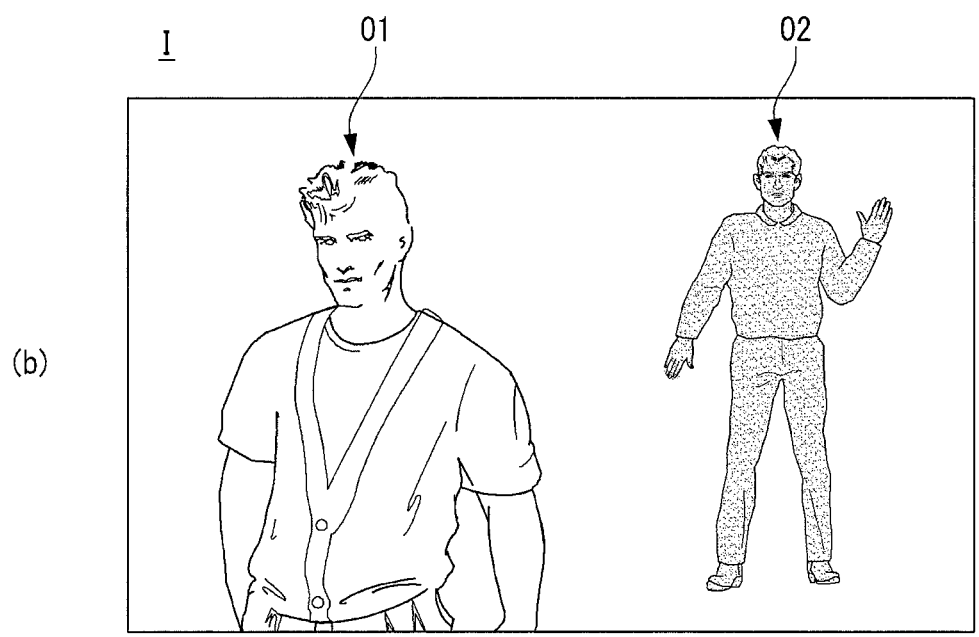
(b)

FIG. 8
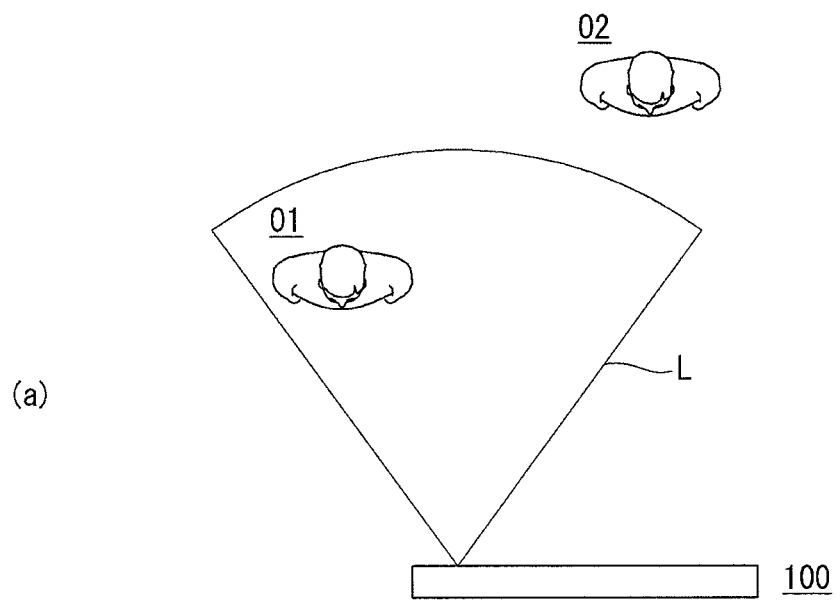
(a)
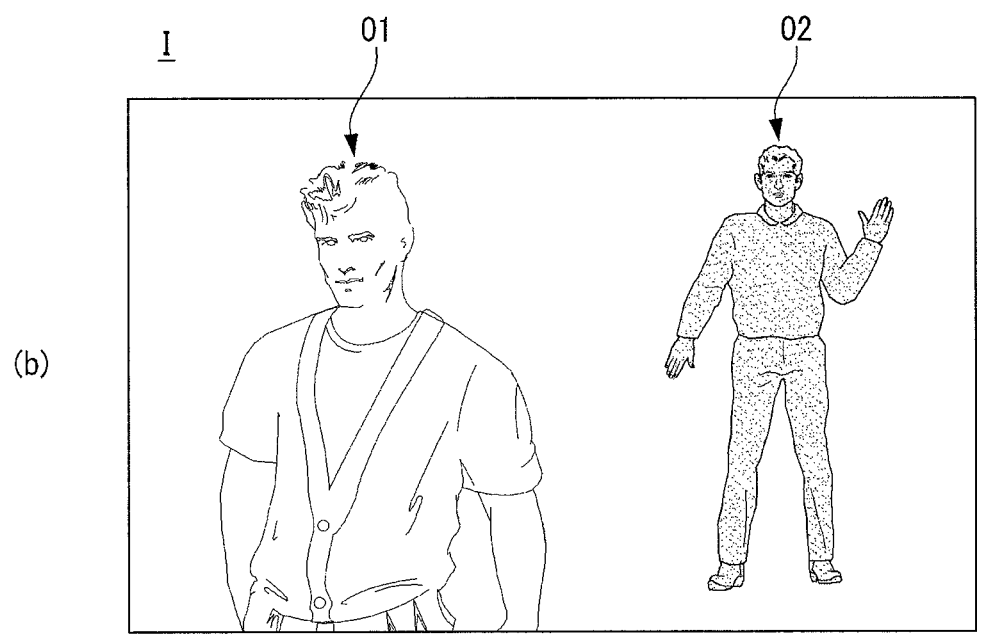
(b)

FIG. 10
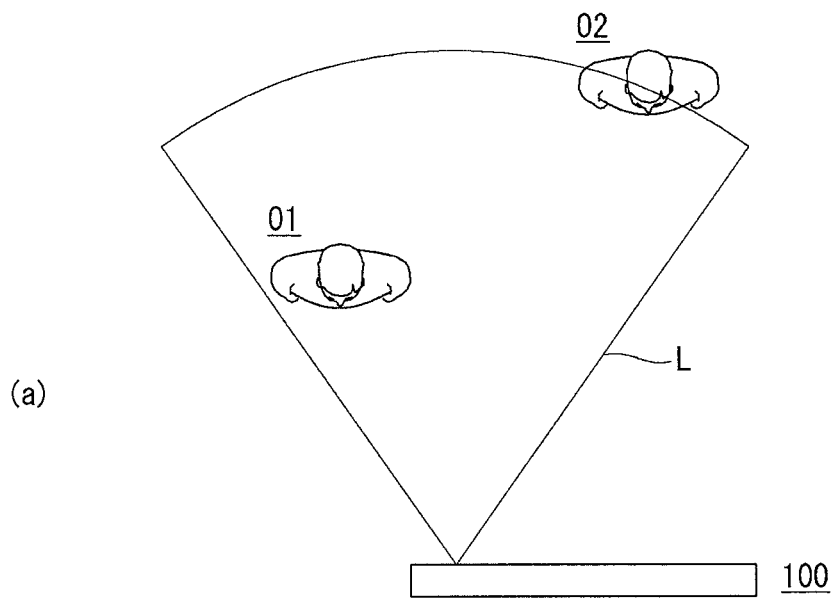
(a)
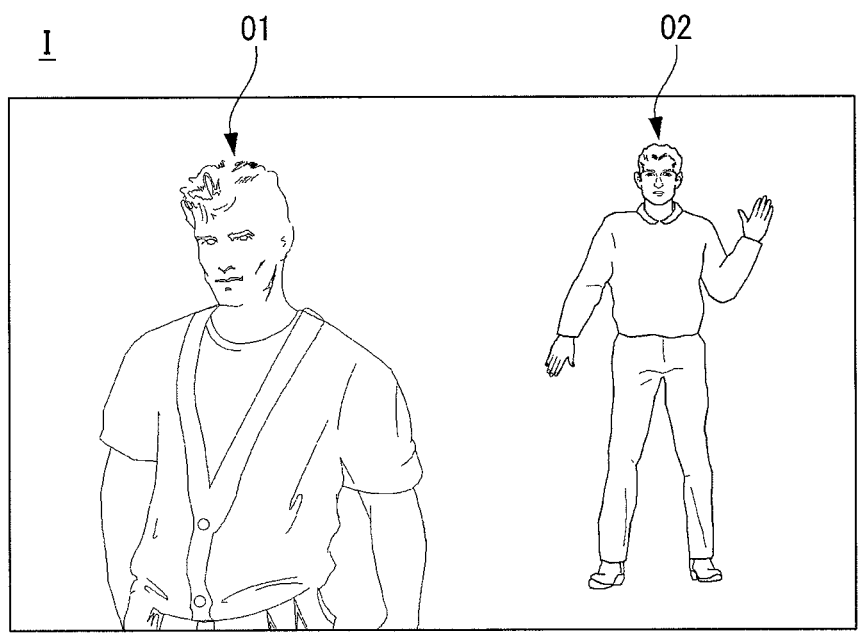
(b)

FIG. 13
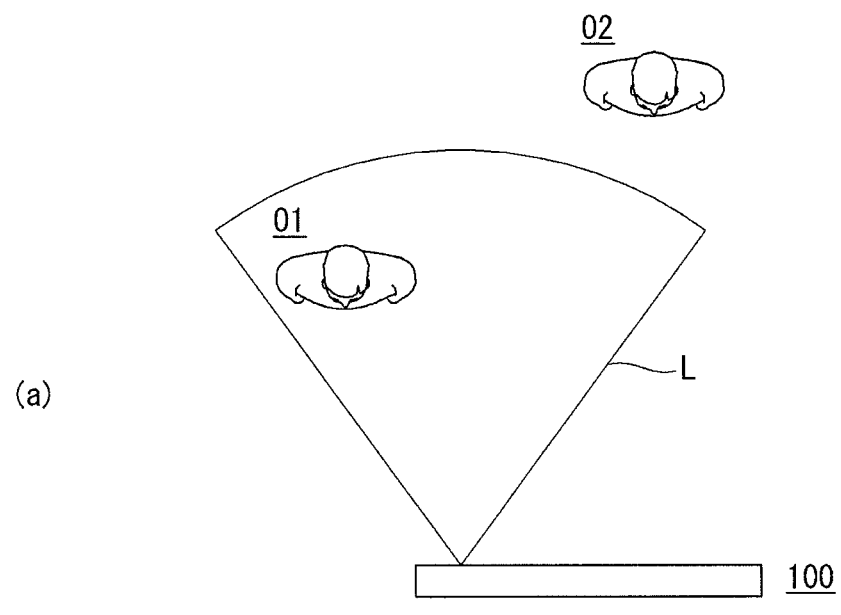
(a)
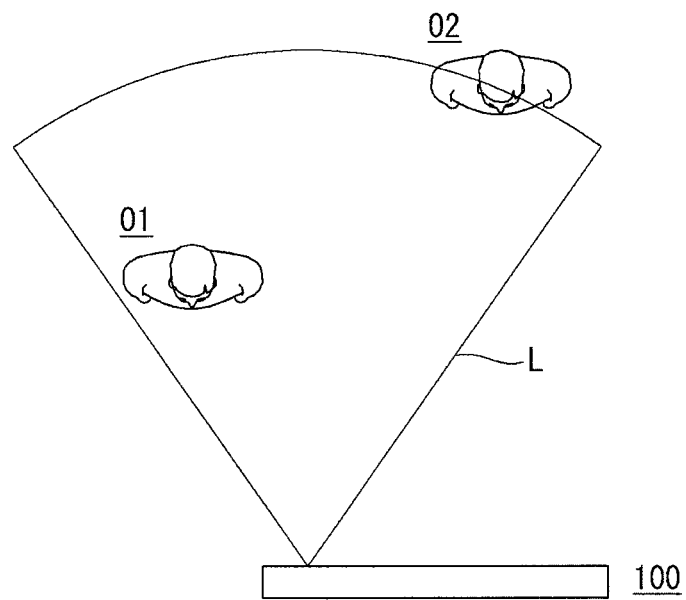
(b)

FIG. 16
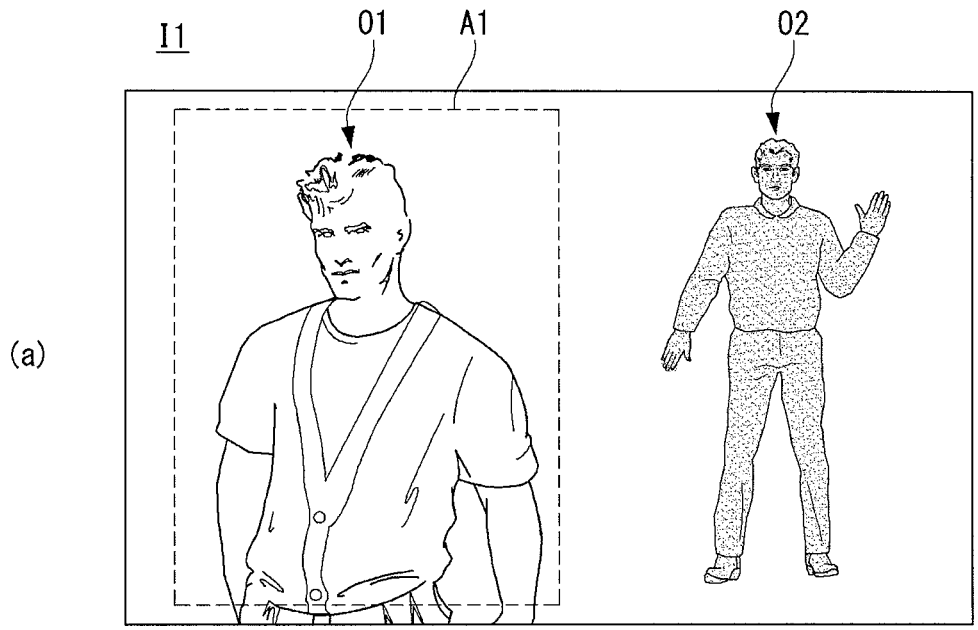
(a)
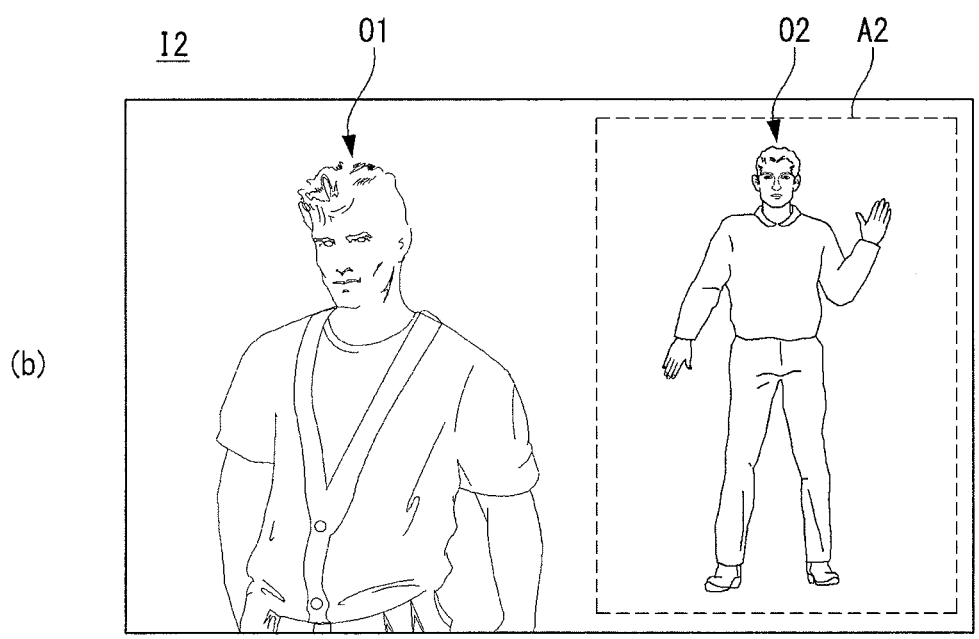
(b)

FIG. 17
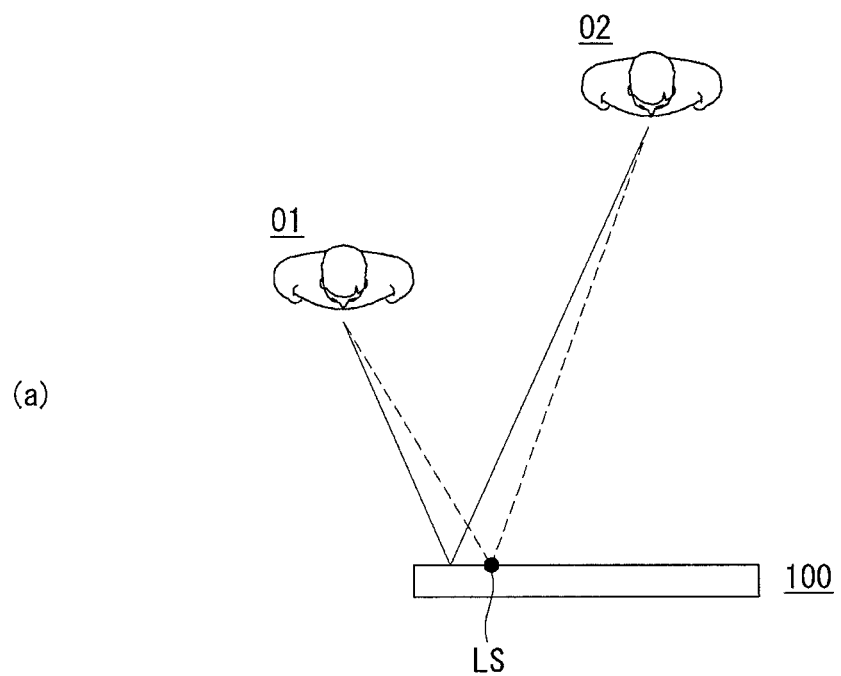
(a)
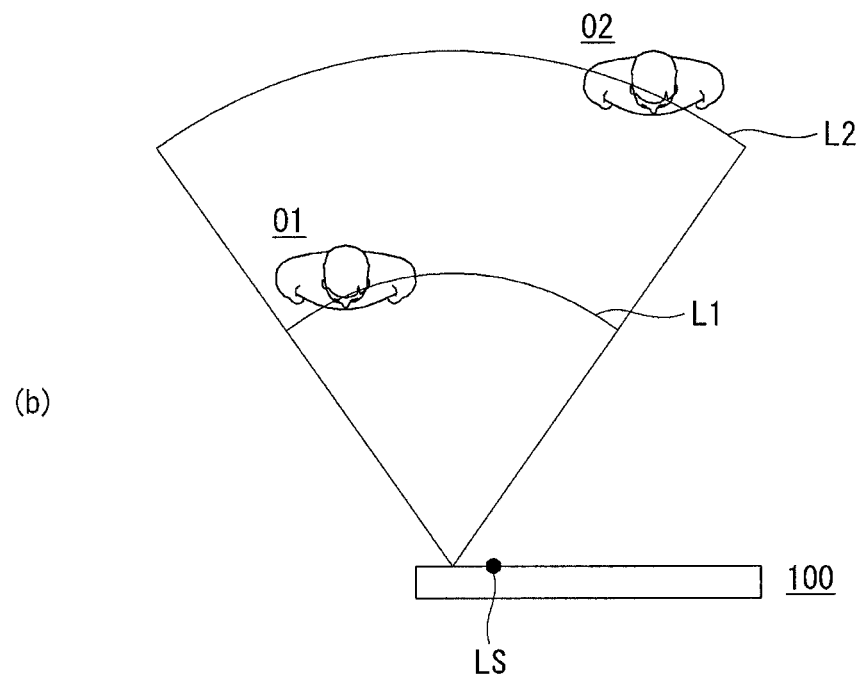
(b)

ed embodiment(s) of the invention and together with the description serve to explain the principle of the invention.

FIG. 1 is a block diagram of a mobile terminal according to an embodiment;

FIG. 2A is a front perspective view of the mobile terminal according to an embodiment;

FIG. 2B is a rear perspective view of the mobile terminal according to an embodiment;

FIG. 3 is a flowchart illustrating an operation of the mobile terminal shown in FIG. 1;

FIGS. 4 to 6 are overviews illustrating an operation of the mobile terminal shown in FIG. 3;

FIG. 7 is a flowchart illustrating the operation of the mobile terminal shown in FIG. 1 in detail;

FIGS. 8 to 11 are overviews illustrating the operation of the mobile terminal, shown in FIG. 7;

FIGS. 12 to 14 are overviews illustrating an operation of the mobile terminal according to another embodiment of the present invention;

FIGS. 15 and 16 are overviews illustrating an operation of the mobile terminal according to another embodiment of the present invention; and FIG. 17 includes overviews illustrating an operation of the mobile terminal according to another embodiment of the present invention.

MOBILE TERMINAL AND CONTROL METHOD THEREOF CAPTURING FIRST AND SECOND IMAGES WITH FIRST AND SECOND FLASHES

CROSS-REFERENCE TO RELATED APPLICATIONS

Pursuant to 35 U.S.C. §119(a), this application claims the benefit of earlier filing date and right of priority to Korean Patent Application No. 10-2013-0117517, filed on Oct. 1, 2013, the contents of which are incorporated by reference herein in their entirety.

BACKGROUND OF THE INVENTION

1. Field of the Invention

The present invention relates to a mobile terminal, and more particularly, to a mobile terminal and corresponding method for generating a new image using specific areas of a plurality of images captured during a plurality of flashes.

2. Discussion of the Related Art

Terminals are now multimedia players having multiple functions for capturing pictures or moving images, playing music, moving image files and games and receiving broadcasting programs. Terminals can be categorized as mobile terminals and stationary terminals. The mobile terminals can be further comprised of handheld terminals and vehicle mounted terminals.

Cameras are also provided on mobile terminals so the user can take pictures with their mobile terminal. However, the features provided with respect to the camera are limited, which inconveniences the user.

SUMMARY OF THE INVENTION

Accordingly, an object of the present invention is to provide a mobile terminal and corresponding method for generating a new image using specific areas of a plurality of images captured during a plurality of flashes.

To achieve these and other advantages and in accordance with the purpose of the present invention, as embodied and broadly described herein, the present invention provides in one aspect a mobile terminal including a wireless communication unit configured to provide wireless communication; a camera; a flash; and a controller configured to capture, via the camera, a first image while controlling the flash to emit a first flash, capture, via the camera, a second image while controlling the flash to emit a second flash, and generate a third image by combining a first area of the first image and a second area of the second image. The present invention also provides a corresponding method of controlling the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate

DETAILED DESCRIPTION

Arrangements and embodiments may now be described more fully with reference to the accompanying drawings, in which embodiments may be shown. Embodiments may, however, be embodied in many different forms and should not be construed as being limited to embodiments set forth herein; rather, embodiments may be provided so that this invention will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other. The mobile terminal may include a cellular phone, a smart phone, a laptop computer, a digital broadcasting terminal, personal digital assistants (PDA), a portable multimedia player (PMP), a navigation system and/or so on.

Figure 1:
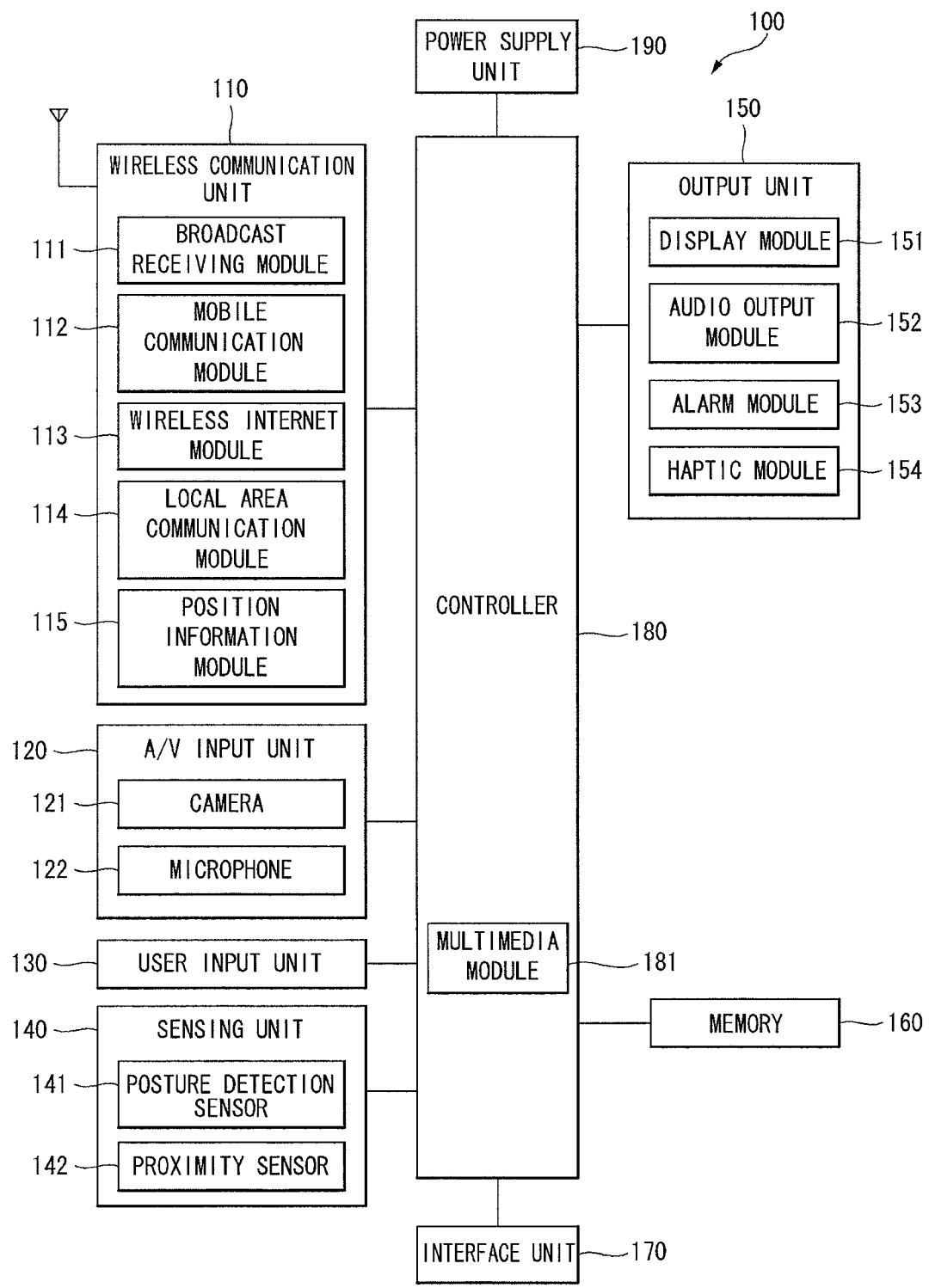

FIG. 1 is a block diagram of a mobile terminal according to an embodiment. Other embodiments, configurations and arrangements may also be provided. As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 are examples and may vary.

The wireless communication unit 110 includes at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 can receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 can receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 can transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 can confirm or obtain a location or a position of the mobile terminal 100. The location information module 115 can obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 can input (or receive) an audio signal and/or a video signal. The A/V input unit 120 may include a camera 121 and a microphone 122. The camera 121 can process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 can receive an external audio signal in a call mode, a recording mode and/or a speech recognition mode, and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 can receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 can sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 can sense whether the power supply 190 supplies power and/or whether the interface 170 is connected to an external device. The sensing unit 140 may also include a posture detecting sensor 141 and a proximity sensor 142. The sensing unit 140 may sense a motion of the mobile terminal 100. The posture detecting sensor can detect a posture of the mobile terminal 100.

The output unit 150 can generate visual, auditory and/or tactile output, and the output unit 150 may include the display 151, an audio output module 152, an alarm 153 and a haptic module 154. The display 151 can display information processed by the mobile terminal 100. The display 151 can display a user interface (UI) and/or a graphic user interface (GUI) related to a telephone call when the mobile terminal 100 is in the call mode. The display 151 can also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display. The transparent display may be a transparent liquid crystal display. A rear structure of the display 151 may also be of a light transmissive type. Accordingly, a user can see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides. When the display 151 and a sensor sensing touch (hereafter referred to as a touch sensor) form a layered structure that is referred to as a touch screen, the display 151 can be used as an input device in addition to an output device. The touch sensor may be in the form of a touch film, a touch sheet, and/or a touch pad, for example.

The touch sensor can convert a variation in pressure applied to a specific portion of the display 151 or a variation in capacitance generated at a specific portion of the display 151 into an electric input signal. The touch sensor can sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The proximity sensor 142 may be located in an internal region of the mobile terminal 100, surrounded by the touch screen, and/or near the touch screen. The proximity sensor 142 can sense an object approaching a predetermined sensing face or an object located near the proximity sensor 142 using an electromagnetic force or infrared rays without having mechanical contact. The proximity sensor 142 may have a lifetime longer than a contact sensor and may thus have a wide application in the mobile terminal 100.

The proximity sensor 142 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 142.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 142 can sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 can output audio data received from the wireless communication unit 110 or stored in the memory 160 in a call signal receiving mode, a telephone call mode or a recording mode, a speech recognition mode and a broadcasting receiving mode. The audio output module 152 can output audio signals related to functions, such as a call signal incoming tone and a message incoming tone, performed in the mobile terminal 100. The audio output module 152 may include a receiver, a speaker, a buzzer, and/or the like. The audio output module 152 can output sounds through an earphone jack. The user may hear the sounds by connecting an earphone to the earphone jack.

The alarm 153 can output a signal for indicating generation of an event of the mobile terminal 100. For example, an alarm can be generated when receiving a call signal, receiving a message, inputting a key signal, and/or inputting a touch. The alarm 153 can also output signals in forms different from video signals or audio signals, for example, a signal for indicating generation of an event through vibration. The video signals and/or the audio signals may also be output through the display 151 or the audio output module 152.

The haptic module 154 can generate various haptic effects that the user can feel. One example of the haptic effects is vibration. An intensity and/or pattern of vibration generated by the haptic module 154 may also be controlled. For example, different vibrations may be combined and output or may be sequentially output. The haptic module 154 can generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 can store a program for operations of the controller 180 and/or temporarily store input/output data such as a phone book, messages, still images, and/or moving images. The memory 160 can also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 can serve as a path to external devices connected to the mobile terminal 100. The interface 170 can receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 can also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
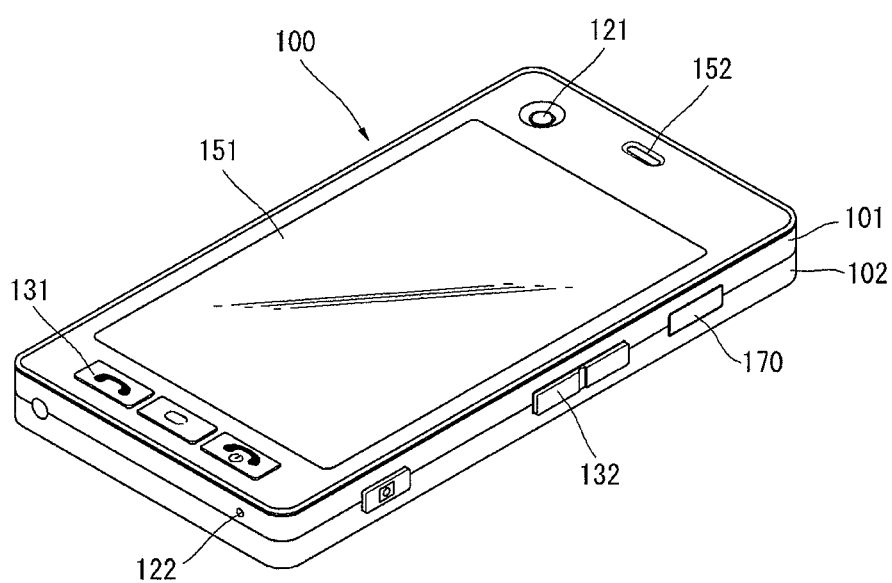

Next, FIG. 2A is a front perspective view of a mobile terminal (or a handheld terminal) according to an embodiment. The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102. The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 can receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling. The first and second operating units 131 and 132 can receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
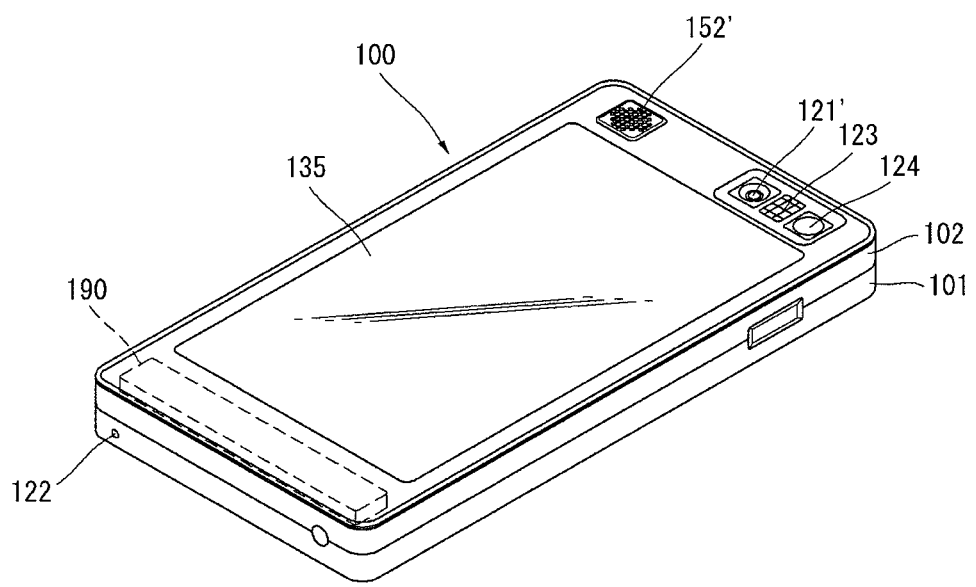

FIG. 2B is a rear perspective view of the mobile terminal (shown in FIG. 2A) according to an embodiment. Referring to FIG. 2B, a camera 121' may be additionally attached to the rear side of the terminal body (i.e., the rear case 102). The camera 121' may have a photographing direction opposite to that of the camera 121 and may have pixels different from those of the camera 121.

For example, it may be desirable that the camera 121 has lower pixels such that the camera 121 may capture an image of a face of a user and transmit the image to a receiving part when video telephony while the camera 121' has higher pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102. The touch pad 135 can operate in connection with the display 151 of the front case 101. The touch pad 135 may be located in parallel with the display 151 behind the display 151. The touch panel 135 may be identical to or smaller than the display 151 in size.

Figure 3:
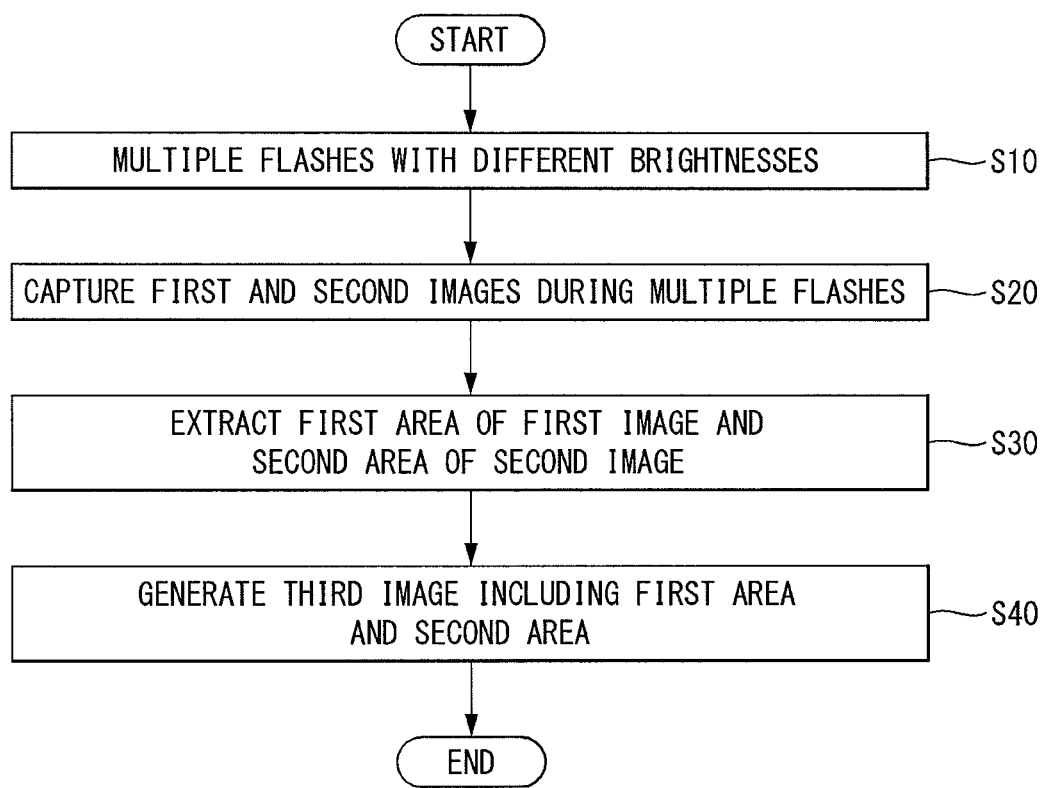

Next, FIG. 3 is a flowchart illustrating an operation of the mobile terminal shown in FIG. 1. As shown, the controller 180 of the mobile terminal 100 according to an embodiment of the present invention can control a plurality of flashes with different intensities of illumination to be generated (S10). Photographing using the camera 121 may be performed in various environments. For example, image capture can be performed in environments having various intensities of illumination.

In image capture using the camera 121, the intensity of illumination may be generally divided into three phases: a first phase corresponding to a low illumination environment of 30 Lux or less; a second phase corresponding to an environment having an illuminance in the range of 30 to 100 Lux; and a third phase corresponding to a high illumination environment of 100 Lux or higher.

The controller 180 can use the internal flash 123 in the first and second phases. For example, the second phase may correspond to an indoor photographing environment and the controller 180 can make up for insufficient intensity of illumination using the flash 123 in the second phase.

The controller 180 can control the flash 123 to generate a plurality of flashes. That is, the controller 180 can control the flash 123 to discontinuously flash at least twice. A plurality of flashes may be divided into at least one preliminary flash and at least one main flash according to purpose. For example, a plurality of preliminary flashes may be followed by a main flash in order to prevent red eye. However, multiple flashes of the flash 123 of the mobile terminal 100 according to an embodiment of the present invention differ from multiple flashes for prevention of red eye.

The controller 180 can control the plurality of flashes to have different intensities of illumination. For example, the first flash can have an intensity of illumination of A and the second flash can have an intensity of illumination of A+a. Three or more flashes can be generated. The controller 180 according to an embodiment of the present invention can generate a control signal for controlling at least two flashes to have different intensities of illumination in the case of three or more flashes. For example, while first and second flashes have a first intensity of illumination and third and fourth flashes have a second intensity of illumination, the first intensity of illumination may differ from the second intensity of illumination.

The controller 180 can change the control signal so as to control the plurality of flashes to have different intensities of illumination. That is, the controller 180 can control the flashes to have different intensities of illumination without physically changing the flash 123. Intensity of illumination may be adjusted by changing current applied to the flash 123. For example, the intensity of illumination when 1000 mA is applied to the flash 123, the intensity of illumination when 800 mA is applied to the flash 123 and the intensity of illumination when 600 mA is applied to the flash 123 may be different from one another. The controller 180 can control the plurality of flashes to have different intensities of illumination by applying different levels of current to the flash 123 based on the current illumination state. An illumination difference between flashes will be described in detail later.

First and second images can then be captured during the plurality of flashes (S20). The controller 180 can control the camera 121 to capture an image substantially simultaneously with the plurality of flashes. That is, the controller 180 can control the camera to capture an image while supplementing illumination through flashes. Accordingly, an image including an object captured in appropriate intensity of illumination can be obtained even in a low illumination state.

For example, a first image includes a first object relatively close to the mobile terminal 100, which is captured in an appropriate intensity of illumination, and a second image includes a second object at a distance from the mobile terminal 100, which is captured in an appropriate intensity of illumination. This can be easily understood considering multiple flashes with different intensities of illumination. For example, for a plurality of flashes with the same intensity of illumination, the first object close to the mobile terminal 100 can be captured in high illumination due to light saturation and the second object at a distance from the mobile terminal 100 can be captured in low illumination, in both the first and second images.

For a plurality of flashes with different intensities of illumination, one flash can be generated such that the first object is captured in appropriate illumination and another flash can be generated such that the second object is captured in appropriate illumination. Appropriate illumination may be detected through an image captured through at least one of the plurality of flashes, which will be described in detail later.

A first area of the first image and a second area of the second image can then be extracted (S30). The first and second images can be captured through flashes of the flash 123, which have different intensities of illumination. The first and second images may also be captured at a relatively short interval. For example, the first and second images can be captured through flashes with different intensities of illumination at an interval in the range of one to several seconds. Accordingly, the first and second images may be pictures of the same object.

Objects included in the first and second images may be captured in different states. For example, the first object close to the mobile terminal 100 can be captured in appropriate illumination and the second object at a distance from the mobile terminal 100 can be captured in low illumination in the first image, whereas the first object can be captured in excessively high illumination and the second object can be captured in appropriate illumination in the second image.

The controller 180 can be configured to respectively extract areas corresponding to appropriate illumination from the first and second images. In the aforementioned example, the area corresponding to the first object can be extracted from the first image and the area corresponding to the second object can be extracted from the second image. That is, the first area of the first image and the second area of the second image can be extracted. The first area and the second area may correspond to intensity of illumination in a predetermined range in the first and second images. That is, the first and second areas may be areas corresponding to optimized illumination in the first and second images.

A third image including the first and second areas can be generated (S40). The third image can be generated based on the first and second areas in satisfactory illumination. That is, the optimum parts of the images captured with different intensities of illumination may be extracted and combined to generate the third image.

Figure 4:
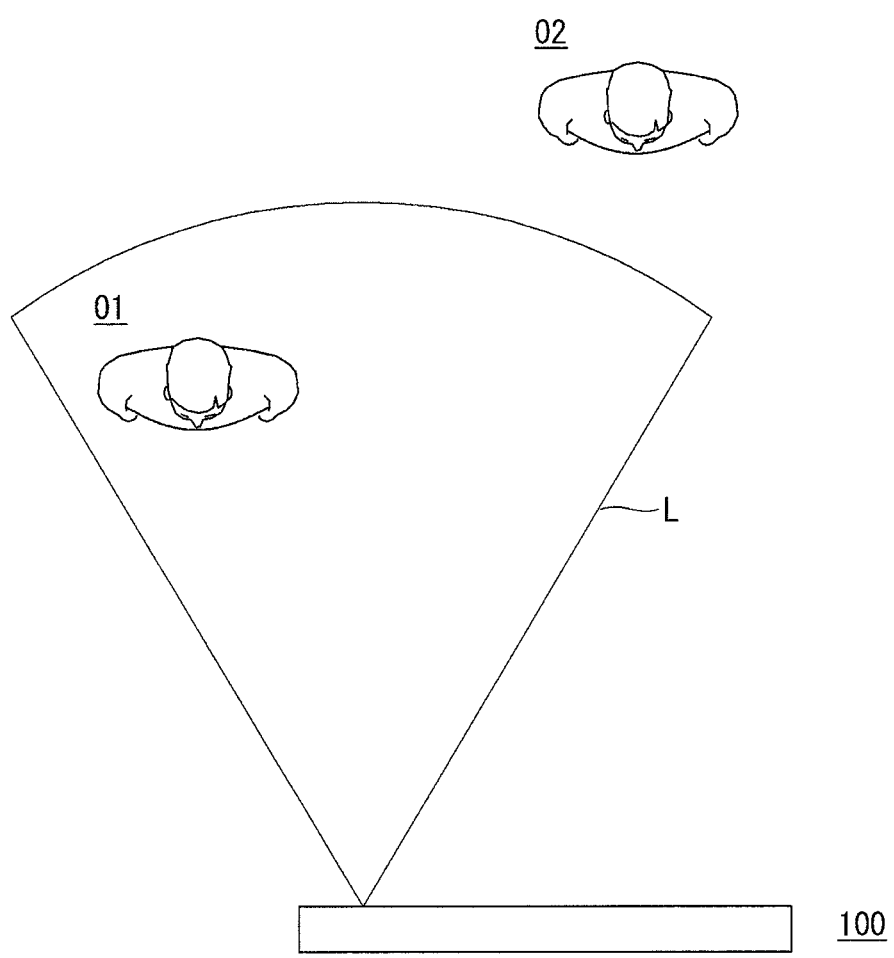
Figure 6:
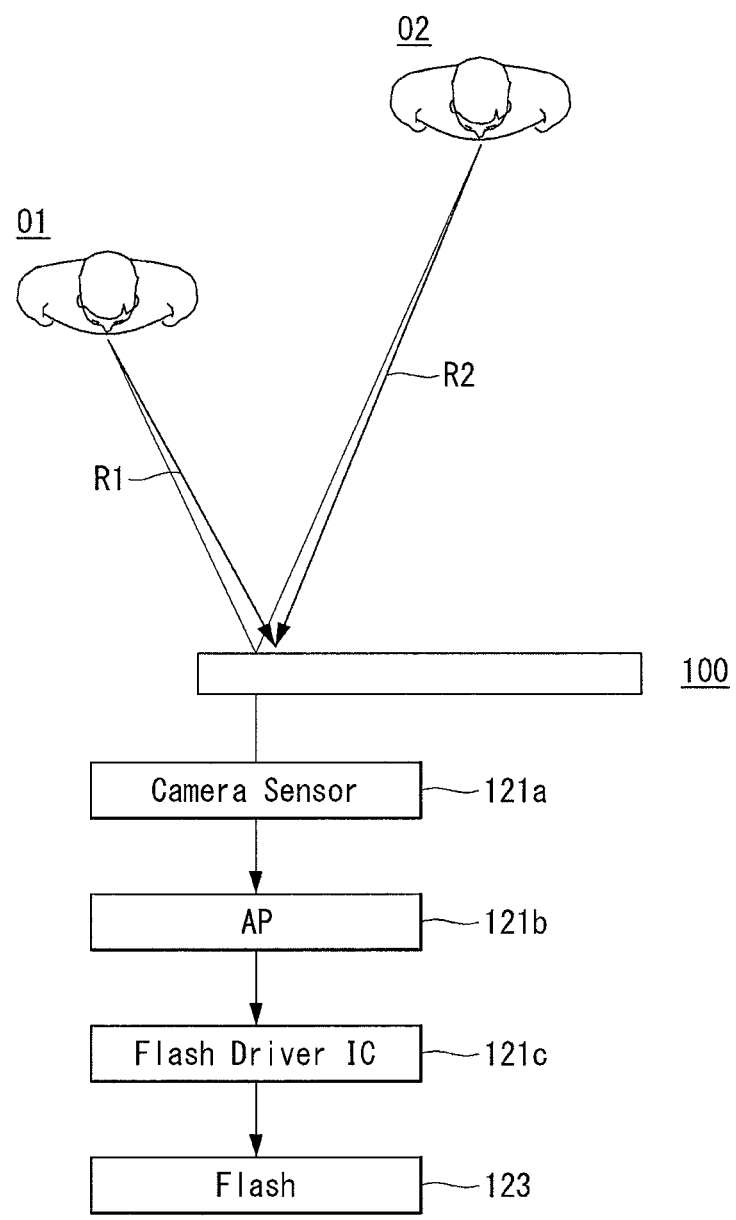

Next, FIGS. 4 to 6 illustrate the operation of the mobile terminal, shown in FIG. 3. In more detail, the controller 180 of the mobile terminal 100 according to an embodiment of the present invention can prevent inappropriate intensity of illumination from being applied to a specific object. In particular, FIGS. 4 and 5 illustrate when the flash 123 flashes light in specific illumination without change in intensity of illumination. That is, the flash 123 operates with a fixed driving current irrespective of surrounding illumination. The flash 123 operates without change in intensity of illumination in a related mobile terminal.

Referring to FIG. 4, since the flash 123 flashes light in specific illumination without change in intensity of illumination, the intensity of illumination L of the flash 123 of the mobile terminal 100 may be inappropriate for both the first object O1 and the second object O2. For example, the intensity of illumination of the flash 123 may be excessively high for the first object O1 and insufficient for the second object O2.

The intensity of illumination of the flash 123 is represented as a fan shape in the following. In addition, the size of the fan shape represents the intensity of illumination L. In FIG. 4, the intensity of illumination L in a fan shape covers the first object O1, which means that the intensity of illumination radiated to the first object O1 is excessive. In addition, the intensity of illumination L in the fan shape does not cover the second object O2, which means that the intensity of illumination radiated to the second object O2 is insufficient.

Referring to FIG. 5(a), the first object O1 close to the mobile terminal 100 may be captured in excessively high illumination and thus optically saturated and the second object O2 at a distance from the mobile terminal 100 may be captured in excessively low illumination in the captured image I due to operation of the flash 123 in a specific intensity of illumination.

Referring to FIG. 5(b), when the fixed intensity of illumination of the flash 123 is suited to the first object O1, the first object O1 can be captured in appropriate illumination. However, the distant second object O2 may be captured in low illumination. When a specific object is captured in low illumination, as shown in FIGS. 5(a) and 5(b), a related art method balances the overall illumination through post-correction of the captured image. However, when the gain is increased during post-correction of the captured image, amplification of noise and/or color distortion may occur. The controller 180 of the mobile terminal 100 according to an embodiment of the present invention can obtain an image optimized for objects by capturing images during a plurality of flashes having different intensities of illumination. Accordingly, amplification of noise and/or color distortion due to post-correction can be prevented.

Referring to FIG. 6, the mobile terminal 100 according to an embodiment of the present invention can sense brightness's of objects through at least one flash and determine an appropriate intensity of illumination based on the sensed brightness's. The controller 180 can control the flash 123, for example, the controller 180 can control a preliminary flash to be generated before a main flash. The camera sensor 121a of the camera 121 may operate upon preliminary flash.

Further, the camera sensor 121a may be an image sensor. That is, the camera sensor 121a may be a sensor that receives light from the camera 121 and converts the light into an electric signal. As shown in FIG. 6, the camera sensor 121a can sense light R1 and right R2 reflected by the objects. That is, the camera sensor 121a can transmit electric signals corresponding to the reflected light R1 and R2 to an AP 121b.

The mobile terminal 100 according to an embodiment of the present invention can directly sense brightness's of the objects. Accordingly, the brightness's of the objects can be sensed more correctly. This differs from the related art method of correcting a captured image using a post-processing algorithm.

Further, the AP 121b may be an application processor. The AP 121b can serve as a controller of the mobile terminal 100 and/or a graphics processing unit. The AP 121b can determine driving current during the next flash of the flash 123 based on the reflected light R1 and R2. In addition, the AP 121b can determine driving current of the next flash based on intensities of the reflected right R1 and R2.

The intensities of the reflected light R1 and R2 depend on distances between the mobile terminal 100 and the first and second objects O1 and O2. For example, the intensity of the first reflected light R1 may be higher than the intensity of the second reflected light R2 when other conditions are identical for the first and second reflected light R1 and R2. This means that the first object O1 related to the first reflected light R1 is located closer than the second object O2.

In addition, the AP 121b can sense the distances between the mobile terminal 100 and the first and second objects O1 and O2 based on the intensities of the reflected light R1 and R2 and determine the intensity of the next flash based on the distances. For example, the AP 121b can determine the intensity of the second flash optimized for the first object O1 and the intensity of the third flash optimized for the second object O2. A flash driver ID 121c generates driving currents based on the intensities of illumination, determined by the AP 121b. The driving currents generated by the flash driver IC 121c may be sequentially applied to the flash 123.

Figure 7:
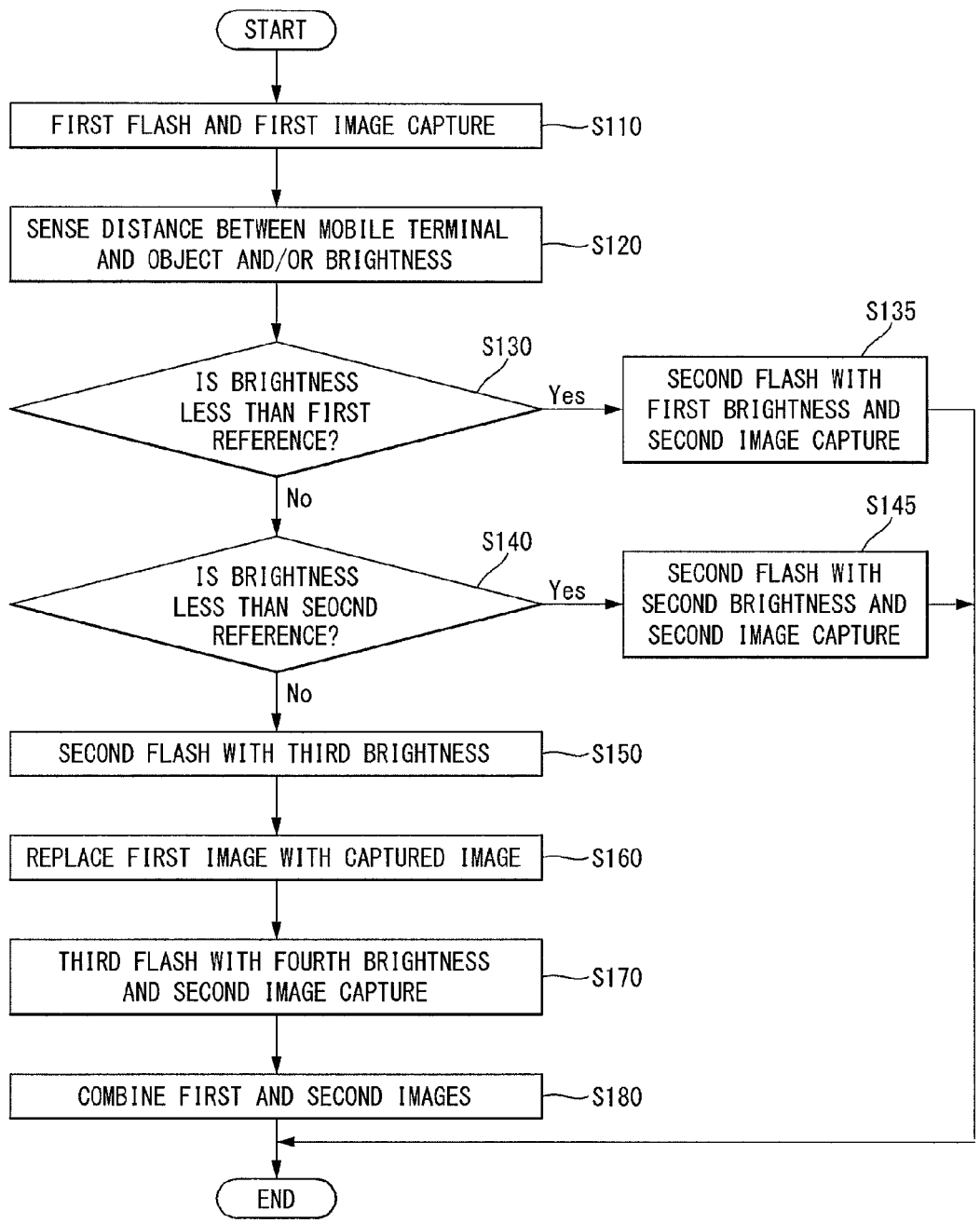
Figure 9:
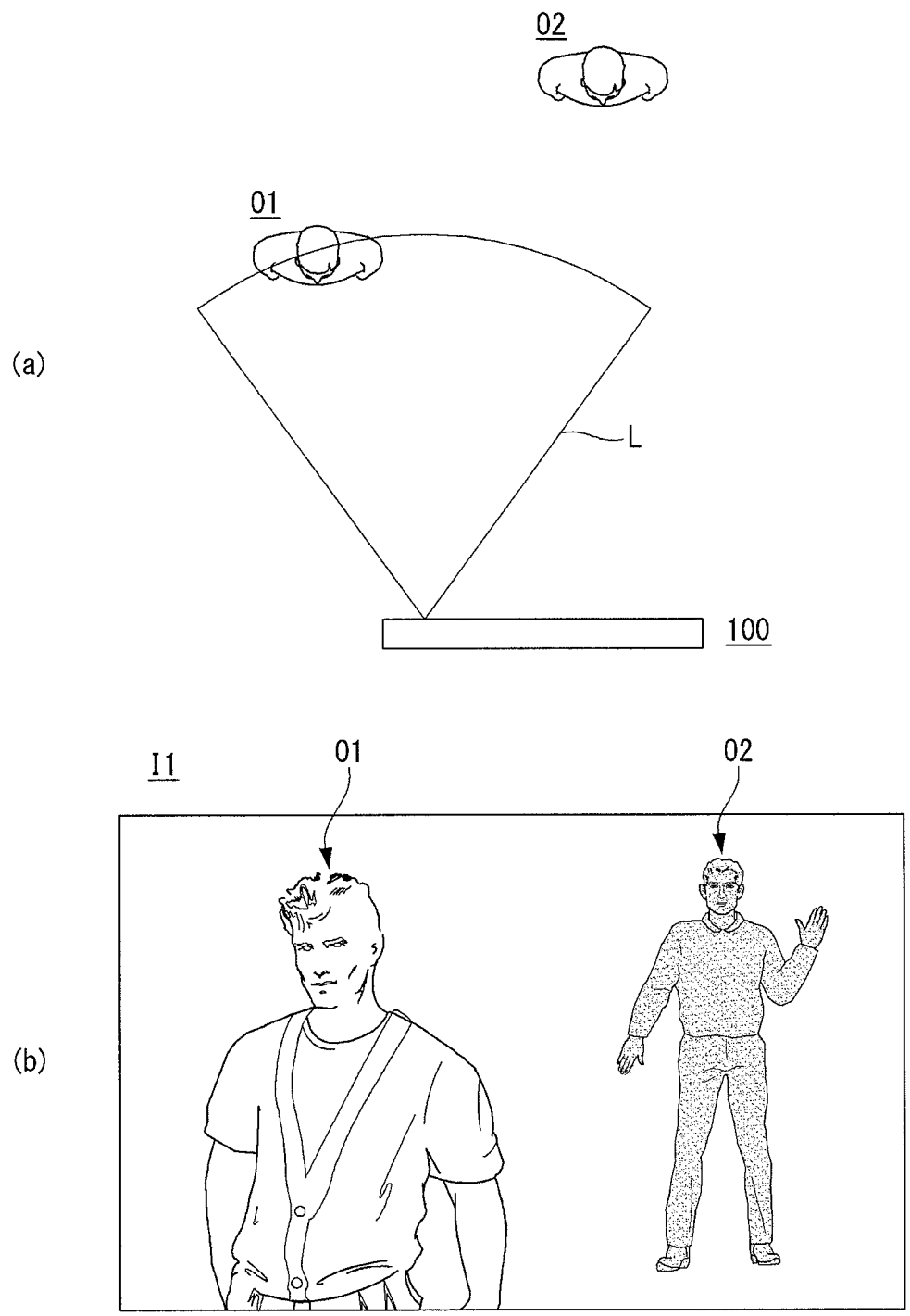

Next, FIG. 7 is a flowchart illustrating operations of the mobile terminal shown in FIG. 1. As shown, the controller 180 according to an embodiment of the present invention can generate a first flash and capturing a first image (S110) and sense distances between the mobile terminal 100 and objects and/or brightness's of the objects (S120). The first flash may be a flash having a predetermined intensity. For example, when it is determined from ambient illuminance that photographing using the flash 123 is required, the controller 180 controls the flash 123 to flash light in predetermined intensity of illumination. The first image may be captured during the first flash.

The controller 180 can sense distances between the mobile terminal 100 and the objects and/or brightness's of the objects through the captured first image. The first image may include various objects. The objects may be located at different distances from the camera 121 and may have different brightness's depending on distances between the camera 121 and the objects. For example, an object close to the camera 121 is bright since a large quantity of light from the flash bulb 123 is applied thereto, whereas an object at a distance from the camera 121 is dark since a small quantity of light from the camera 121 is applied thereto.

When the intensity of illumination of the flash 123 is fixed, the controller 180 can estimate the distances between the mobile terminal 100 and the objects based on the brightness's of the objects. The controller 180 determines whether the brightness of an object is less than a first reference value (S130). When the brightness is less than the first reference value (Yes in S130), a second image is captured during the second flash with a first intensity of illumination (S135).

The first reference value may correspond to lowest brightness of an object. For example, the first reference value can correspond to brightness of 30 Lux or lower. The controller 180 can control the flash 123 to generate a second flash with a first illuminance upon determining that the brightness of the object is low. The first illuminance may be a highest illuminance. For example, the first illuminance may be an illuminance that can be obtained when driving current of 1000 mA is applied to the flash 123. Low brightness of the object may mean that a low intensity of illumination is provided to the object. Accordingly, a high intensity of illumination can be provided to obtain an image in appropriate brightness.

High driving current may be applied to the flash 123A and a second image may be captured. The second image may be a final image. That is, an appropriate intensity of illumination for the object can be determined through one preliminary flash and the final image can be obtained through the second flash corresponding to a main flash.

The controller 180 determines whether the brightness of the object is less than a second reference value (S140) and when the brightness is less than the second reference value (Yes in S140), the second image can be captured through the second flash with a second illuminance (S145).

The second reference value may correspond to a middle level of brightness. For example, the second reference value may be 100 lux or lower. The controller 180 can control the second flash with the second illuminance to be generated upon determining that the brightness of the object is a middle level. The second illuminance may be a middle level of illuminance. For example, the second illuminance may be an illuminance that can be obtained when driving current of 800 mA is applied to the flash 123.

When the brightness of the object exceeds the second reference value (Yes in S140), an image is captured with a third illuminance (S150). The brightness exceeding the second reference value means that the object is captured with brightness higher than 100 Lux. Accordingly, the third illuminance may be relatively low. For example, the third illuminance may be an illuminance that can be obtained when driving current of 600 mA is applied to the flash 123.

The image captured with the third illuminance replaces the first image (S160). When the measured brightness exceeds the second reference value, light saturation occurs for the object located close to the mobile terminal 100 and thus the image may not be clearly recognized. Accordingly, the initially captured image can be replaced by the image captured with a minimum illuminance by applying minimum driving current of 600 mA to the flash 123. In the replaced image, light saturation does not occur for the close object.

The second image is also captured through a third flash with a fourth luminance (S170). The fourth illuminance may be a highest illuminance. For example, the fourth illuminance may be an illuminance that can be obtained when driving current of 1000 mA is applied to the flash 123. When highest driving current is applied, the distant object may be captured with appropriate brightness while light saturation may occur for the close object.

The first and second images are then combined (S180). The first and second images may respectively refer to an image captured with the third illuminance and an image captured with the fourth illuminance. The near object may be represented in appropriate brightness in the image captured with the third illuminance, whereas the distant object may be represented in appropriate brightness in the image captured with the fourth illuminance.

Accordingly, the near object included in the image captured with the third illuminance and the distant object included in the image captured with the fourth illuminance may be extracted and combined to obtain an illuminance-optimized image. Since illuminance-optimized parts of the images are extracted and combined, it is possible to prevent noise and/or color distortion, which can be generated when post-processing is performed on an image in a software manner.

Next. FIGS. 8 to 11 illustrate operations of the mobile terminal, shown in FIG. 7. As shown, the controller 180 according to an embodiment of the present invention can sense distances between the mobile terminal 100 and objects and then acquire an optimized image through a plurality of flashes with different intensities of illumination.

Referring to FIG. 8(a), the controller 180 can control the flash 123 to flash a light with a predetermined intensity of illumination. For example, when photographing using a flash is required since ambient illumination is less than a reference level, the controller 180 can control the flash 123 to flash a light with a predetermined intensity of illumination L. The predetermined intensity of illumination L may cause over saturation of the first object O1 and light insufficiency for the second object O2.

Referring to FIG. 8(b), in an image I captured in the predetermined intensity of illumination L, the first object O1 close to the mobile terminal 100 may be excessively bright and the second object O2 at a distance from the mobile terminal 100 may be dark. The controller 180 can sense distances between the mobile terminal 100 and the first and second objects O1 and O2 based on the image I. For example, the controller 180 can detect that the first object O1 is relatively close to the mobile terminal 100 and the second object O2 is relatively distant from the mobile terminal 100 based on over saturation and light insufficiency.

Upon sensing a relative distance between the mobile terminal 100 and the first and second objects O1 and O2, the controller 180 can determine the intensity of illumination of the flash 123 during the next flash of the flash 123. For example, the controller 180 can determine a lower intensity of illumination for the first object O1 and a higher intensity of illumination for the second object O2.

A relative distance may differ from an absolute distance. Specifically, the relative distance may represent whether the distance between the mobile terminal 100 and the first object O1 is shorter or longer than the distance between the mobile terminal 100 and the second object O2. When the controller 180 recognizes the relative distance, the controller 180 can control intensity of illumination.

Referring to FIG. 9(a), the controller 180 can decrease the intensity of illumination L of the flash 123 during the second flash. That is, the controller 180 can reduce the driving current of the flash 123 to optimize the intensity of illumination L of the flash 123 for the first object O1 based on the sensed relative distance.

Referring to FIG. 9(b), when the driving current of the flash 123 is reduced, the first object O1 may appear in an appropriate intensity of illumination in a captured image I1. However, the second object O2 may be dark due to the decreased intensity of illumination of the flash 123.

Referring to FIG. 10(a), the controller 180 can increase the intensity of illumination L of the flash 123 during the second flash. That is, the controller 180 can increase the driving current of the flash 123 to optimize the intensity of illumination L of the flash 123 for the second object O2 based on the sensed relative distance. Referring to FIG. 10(b), when the driving current of the flash 123 is increased, the second object O2 may appear in an appropriate intensity of illumination in a captured image I2. However, the first object O1 may be light-saturated due to the increased intensity of illumination of the flash 123.

Figure 11:
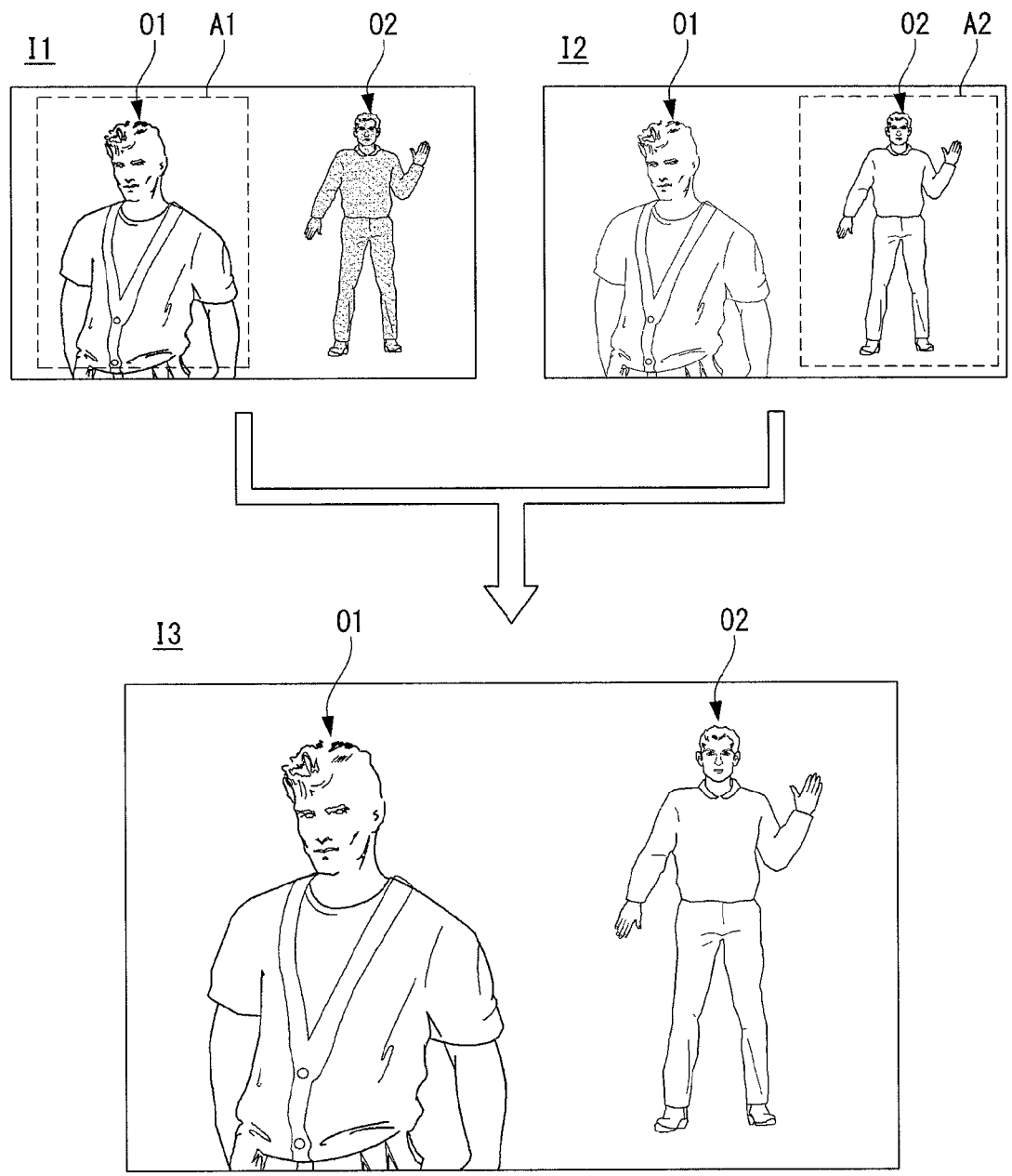

Referring to FIG. 11, the first image I1 captured through the second flash and the second image I2 captured through the third flash may be in different states. That is, a first area A1 of the first image I1, which corresponds to the first object O1, is distinctly represented, whereas a second area A2 of the second image I2, which corresponds to the second object O2, is clearly represented. The controller 180 can combine the first area A1 and the second area A2 to generate a third image I3. Both the first and second objects O1 and O2 may be distinctly represented in the third image I3.

Figure 12:
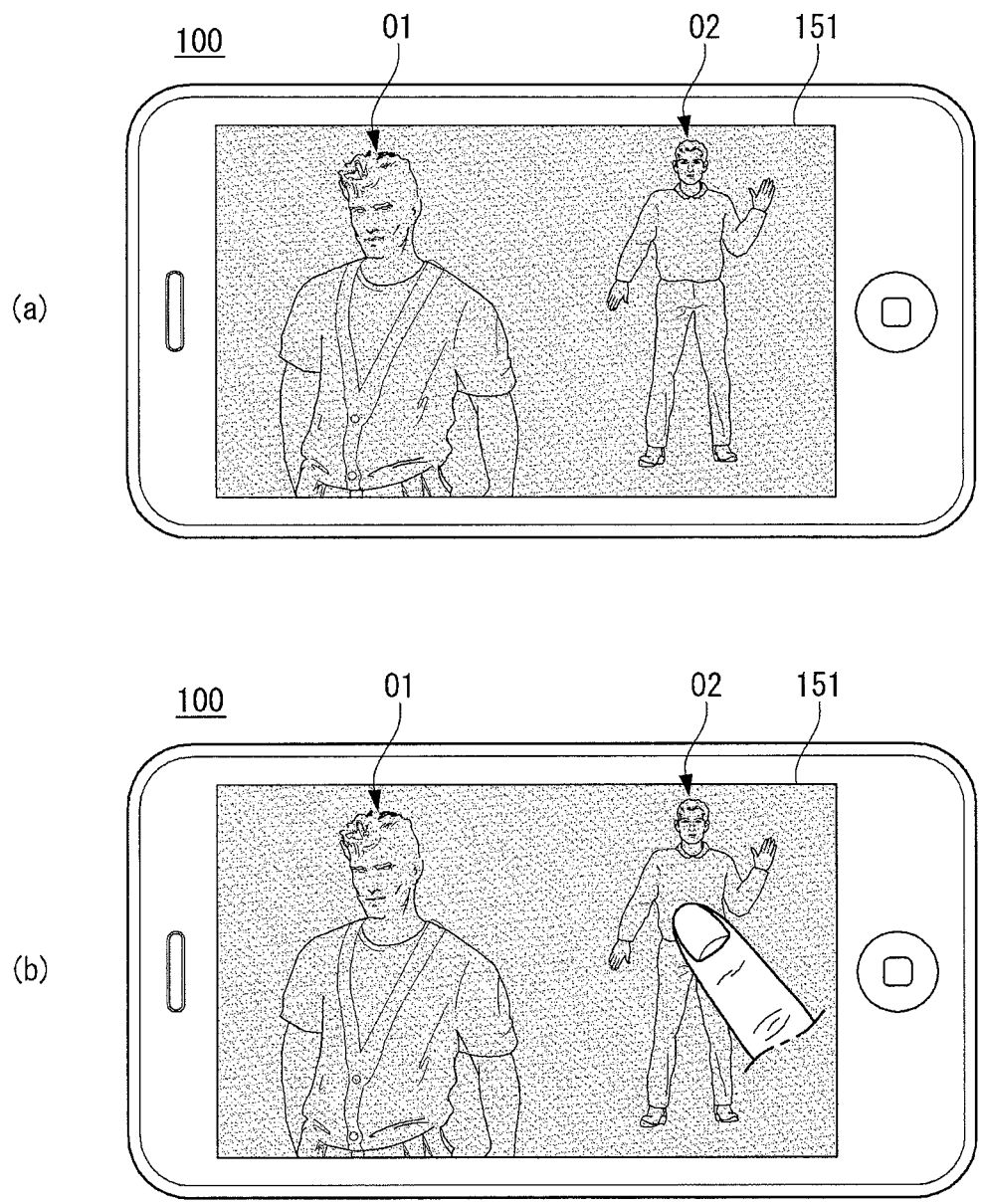
Figure 14:
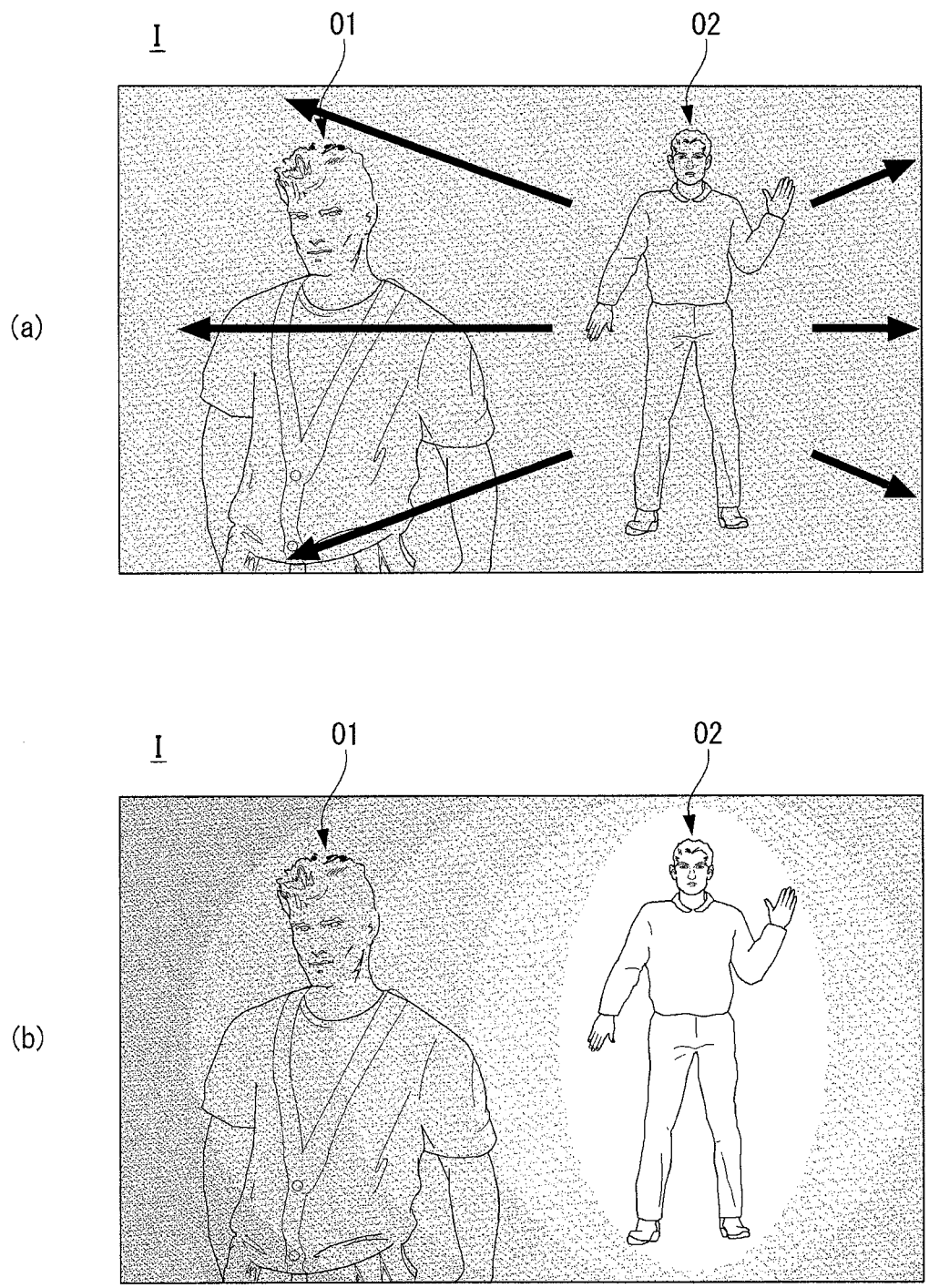

Next, FIGS. 12 to 14 illustrate operations of the mobile terminal according to another embodiment of the present invention. As shown, the controller 180 according to another embodiment of the present invention can capture an image focusing on a specific object selected by a user.

Referring to FIG. 12(a), prior to image capture, the first and second objects O1 and O2 can be captured using the camera 121. In this instance, the flash 123 may be required to capture an image due to low ambient illumination. Referring to FIG. 12(b), the user can select a specific object. For example, the user can select the second object O2 with a finger F. The controller 180 can control illuminance based on the second object O2 selected by the user. For example, the controller 180 can control a finally generated image to include the object selected by the user.

Referring to FIG. 13(a), the controller 180 can control the flash 123 to operate with a predetermined intensity of illumination L. That is, a preliminary flash with the predetermined intensity of illumination L can be generated. Referring to FIG. 13(b), the controller 180 can generate a second flash by controlling the intensity of illumination L to be suited to the second object O2 selected by the user. That is, the controller 180 can control the flash 123 to flash light with an intensity of illumination L according to the distance between the mobile terminal 100 and the second object O2 based on a relative distance according to the preliminary flash.

Referring to FIG. 14(a), an image I with the intensity of illumination optimized for the second object O2 may be captured. The first object O1 may be over saturated. The controller 180 can control the ambient illumination based on the second object O2. For example, the controller 180 can control the ambient illumination radially around the second object O2.

Referring to FIG. 14(b), the first object O1 may be displayed around the second object O2 according to illumination control. Here, the second object O2 may be represented brighter than the first object O1 according to the intention of the user to select the second object O2.

Figure 15:
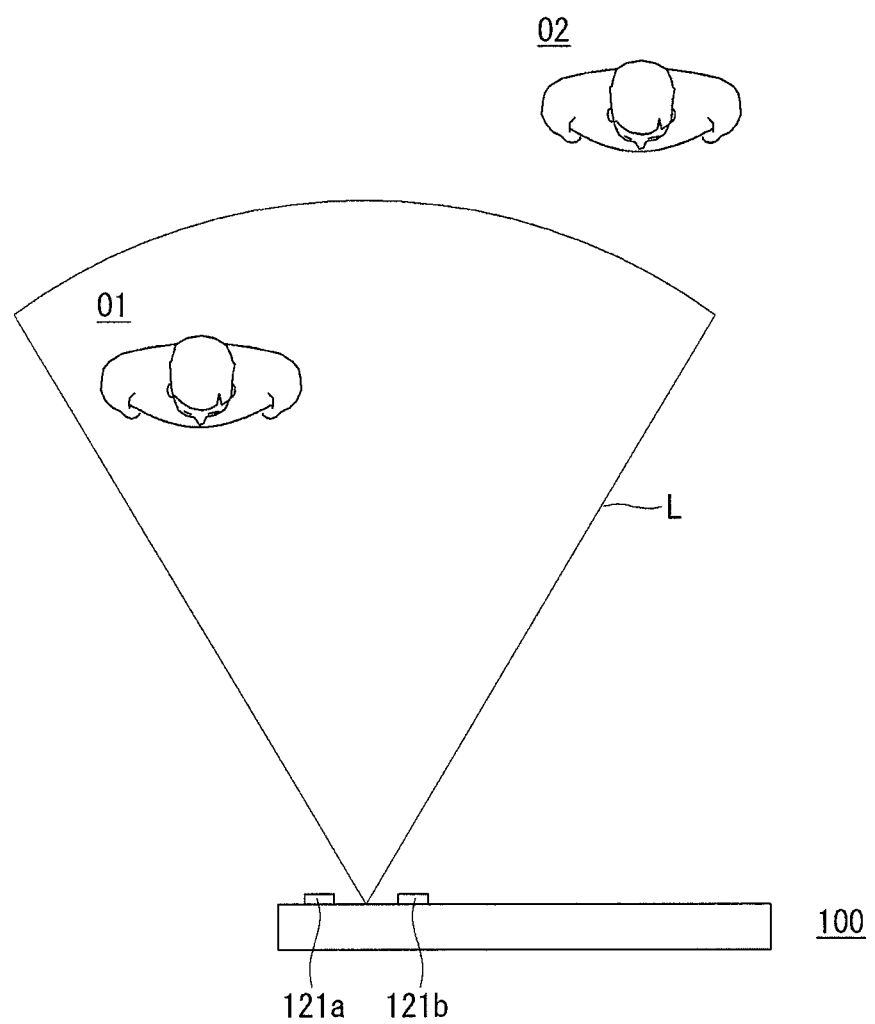

Next, FIGS. 15 and 16 are overviews illustrating operations of the mobile terminal according to another embodiment of the present invention. As shown, the controller 180 according to another embodiment of the present invention may capture an image using a plurality of cameras 121a and 121b having different light sensitivities.

Referring to FIG. 15, the first and second cameras 121a and 121b may be provided to one side of the mobile terminal 100.

The first and second cameras 121a and 121b may also have different light sensitivities. For example, the first camera 121a may be less sensitive to light than the second camera 121b. Accordingly, the second camera 121b can capture an object located in a relatively dark environment.

Further, the flash 123 may have an intensity of illumination L that causes over saturation of the first object O1 but is insufficient for the second object O2. Images may be captured through the first and second cameras 121a and 121b upon operation of the flash bulb 123.

Referring to FIG. 16(a), the first image I1 may be an image captured through the first camera 121a. The first image I1 captured using the first camera 121a less sensitive to light can clearly represent the first object O1. That is, while the intensity of illumination L (shown in FIG. 15) is so high as to cause the first object O1 to be over saturated, the first object O1 can be distinctly represented in the first image I1 since the first camera 121a is less sensitive to light. The second object O2 may appear relatively dark in the first image I1.

Referring to FIG. 16(b), the second image I2 may be an image captured through the second camera 121b. The second image I2 captured using the second camera 121b sensitive to light may clearly represent the second object O2. That is, while the intensity of illumination L (shown in FIG. 15) is insufficient for the second object O2, the second object O2 can be distinctly represented in the second image I1 since the second camera 121b is sensitive light. The first object O1 may be severely over saturated in the second image I2.

The controller 180 can extract a first area A1 of the first image I1 and a second area A2 of the second image I2 and combine the extracted first and second images A1 and A2. That is, the controller 180 can extract optimized parts of the images captured through the cameras 121a and 121b to generate a synthesized image.

Next, FIG. 17 includes overview illustrating an operation of the mobile terminal according to another embodiment of the present invention. As shown, the controller 180 according to an embodiment of the present invention may control the flash 123 to operate based on distances between the mobile terminal and objects, sensed through a distance sensor LS.

Referring to FIG. 17(a), the distance sensor LS may be provided to the mobile terminal 100. The distance sensor LS can sense distances between the mobile terminal and the first and second objects O1 and O2 using ultrasonic waves, infrared light or the like. For example, the distance sensor LS can measure the distances between the mobile terminal and the first and second objects O1 and O2 by calculating time of flight of ultrasonic waves reflected from the first and second objects O1 and O2.

Referring to FIG. 17(b), the controller 180 can control the flash 123 to generate two flashes with different intensities of illumination L1 and L2 based on the distances between the mobile terminal and the first and second objects O1 and O2, measured by the distance sensor LS. For example, the controller 180 can control the flash 123 to generate a flash with a first intensity of illumination L1 for the first object O1 and to generate a flash with a second intensity of illumination L1 for the second object O2

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal can include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A mobile terminal, comprising:
   a camera;
   a flash; and
   a controller configured to:
   control the flash to flash light when surrounding illumination of a plurality of objects is less than a predetermined reference level, and
   calculate distances between the mobile terminal and at least a first and second object included in the plurality of objects through a preliminary flash,
   capture, via the camera, a first image while controlling the flash to emit a first flash,
   capture, via the camera, a second image while controlling the flash to emit a second flash, and
   generate a third image by combining a first area of the first image and a second area of the second image,
   wherein the first flash is used for the first object of the plurality of objects and the second flash is used for a second object of the plurality of objects based on the calculated distances.

2. The mobile terminal of claim 1, wherein the controller is further configured to control the second flash to have a different illumination intensity than the first flash.

3. The mobile terminal of claim 2, wherein the controller is further configured to sense a distance between the mobile terminal and at least one object based on an image captured during at least one preliminary flash so as to determine illumination intensities of the first and second flashes.

4. The mobile terminal of claim 2, wherein the controller is further configured to sense a relative distance between the mobile terminal and at least one object based on an image captured during at least one preliminary flash so as to determine illumination intensities of the first and second flashes.

5. The mobile terminal of claim 1, wherein the controller is further configured to set areas with illumination intensities within a predetermined range in the first and second images as the first and second areas.

6. The mobile terminal of claim 1, wherein the controller is further configured to control a driving current applied to the flash such that the first and second flashes have different illumination intensities.

7. The mobile terminal of claim 1, wherein the controller is further configured to control at least one of the first and second areas to include an object to which a selection signal of a user is applied.

8. The mobile terminal of claim 1, wherein the camera includes first and second cameras having different light sensitivities, and
   wherein the first image is captured through the first camera and the second image is captured through the second camera.

9. The mobile terminal of claim 1, wherein the first flash includes multiple first flashes and the second flash includes multiple second flashes.

10. A method of controlling a mobile terminal, the method comprising:
   controlling, via a controller of the mobile terminal, a flash of the mobile terminal to flash light when surrounding illumination of a plurality of objects is less than a predetermined reference level;
   calculating, via the controller, distances between the mobile terminal and at least a first and second object included in the plurality of objects through a preliminary flash;
   capturing, via a camera of the mobile terminal, a first image while controlling the flash to emit a first flash;
   capturing, via the camera, a second image while controlling the flash to emit a second flash; and
   generating, via the controller, a third image by combining a first area of the first image and a second area of the second image,
   wherein the first flash is used for the first object of the plurality of objects and the second flash is used for a second object of the plurality of objects based on the calculated distances.

11. The method of claim 10, wherein the second flash has a different illumination intensity than the first flash.

12. The method of claim 11, further comprising:
   sensing, via the controller, a distance between the mobile terminal and at least one object based on an image captured during at least one preliminary flash so as to determine illumination intensities of the first and second flashes.

13. The method of claim 11, further comprising:
sensing, via the controller, a relative distance between the mobile terminal and at least one object based on an image captured during at least one preliminary flash so as to determine illumination intensities of the first and second flashes.

14. The method of claim 10, further comprising:
setting, via the controller, areas with illumination intensities within a predetermined range in the first and second images as the first and second areas.

15. The method of claim 10, further comprising:
controlling, via the controller, a driving current applied to the flash such that the first and second flashes have different illumination intensities.

16. The method of claim 10, further comprising:
controlling, via the controller, at least one of the first and second areas to include an object to which a selection signal of a user is applied.

17. The method of claim 10, wherein the camera includes first and second cameras having different light sensitivities, and
wherein the first image is captured through the first camera and the second image is captured through the second camera.

18. The method of claim 10, wherein the first flash includes multiple first flashes and the second flash includes multiple second flashes.

* * * * *